United States Patent [19]

Tischer

[11] Patent Number: 5,083,745
[45] Date of Patent: Jan. 28, 1992

[54] INCREMENTAL ELECTRICALLY ACTUATED VALVE

[75] Inventor: James C. Tischer, La Crescent, Minn.

[73] Assignee: American Standard Inc., New York, N.Y.

[21] Appl. No.: 644,006

[22] Filed: Jan. 18, 1991

[51] Int. Cl.⁵ .............................. F16K 31/04; F16K 3/32
[52] U.S. Cl. ........................... 251/129.11; 251/129.05; 251/175
[58] Field of Search .................. 251/129.11, 129.05, 251/175

[56] References Cited

U.S. PATENT DOCUMENTS 3,363,536  1/1968  Dean, Jr. ................ 251/129.11 X
4,685,655  8/1987  Herd ............................ 251/175 X
5,011,112  4/1991  Glamm ...................... 251/129.11

Primary Examiner—Arnold Rosenthal
Attorney, Agent, or Firm—William J. Beres; David L. Polsley; William O'Driscoll

[57] ABSTRACT

An electrically actuated valve for incremental fluid flow rate control is disclosed. The valve is comprised of a valve body having an interior with a planar outlet surface against which a rectilinear valve element is slidingly operated. The valve body includes an inlet orifice and an outlet orifice in the planar outlet surface for fluid flow through the valve body. The valve element has an orifice therethrough controlling flow through the outlet orifice in accordance with the position of the valve element, which is linearly actuated by a rotary stepper motor. Linear actuation of the valve element by the rotary stepper motor is accomplished by a shaft extending through and rotating in bearings at opposing ends of the valve body. A drive key on the shaft interfits a corresponding slot in the valve element and converts rotary motion of the shaft to linear motion of the valve element.

23 Claims, 8 Drawing Sheets

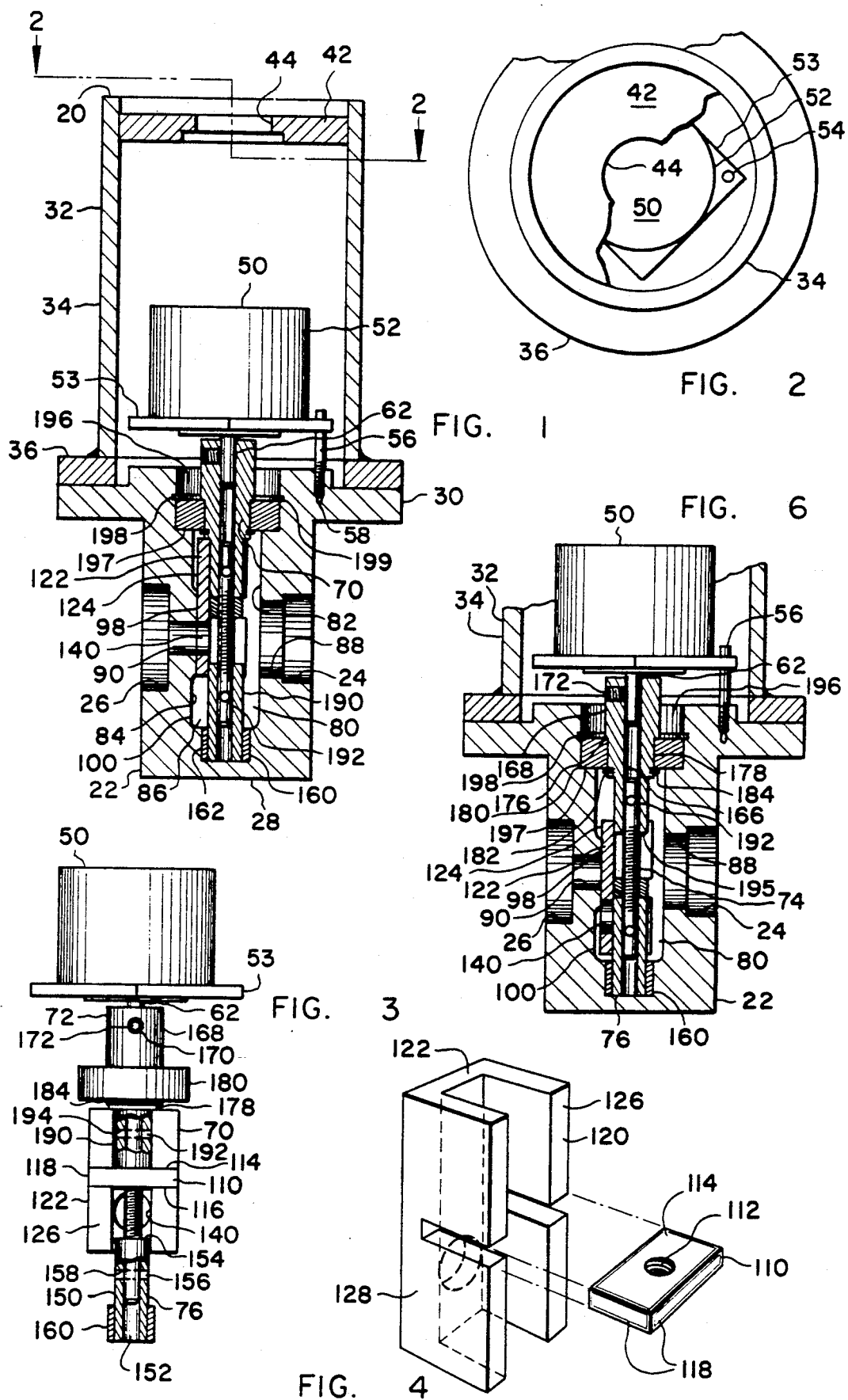

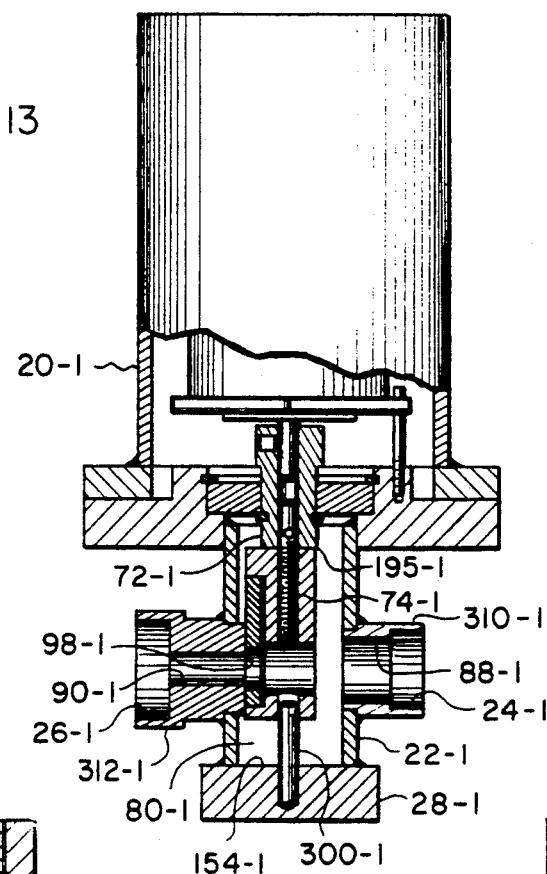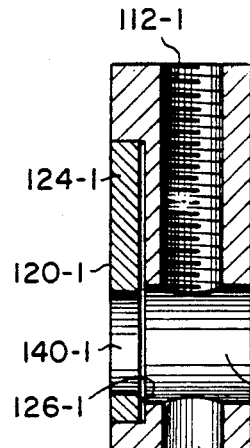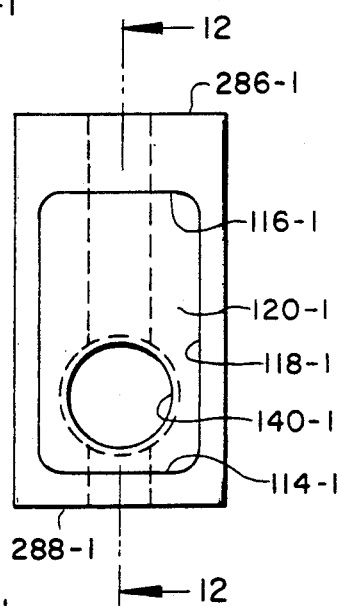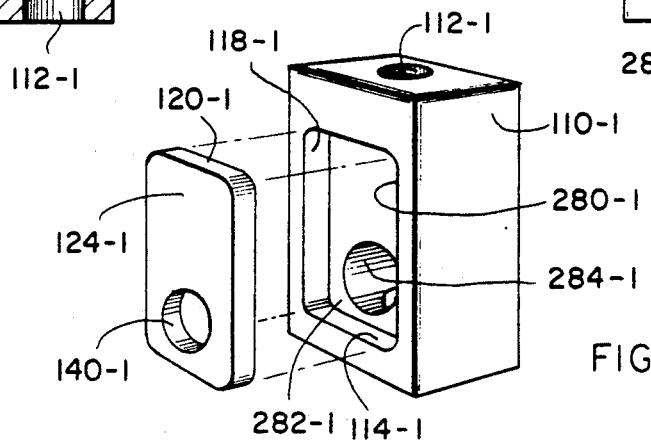

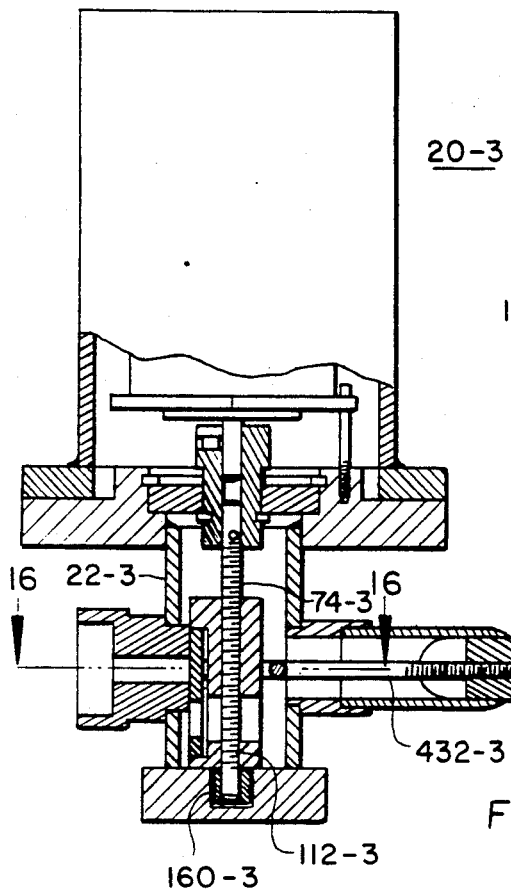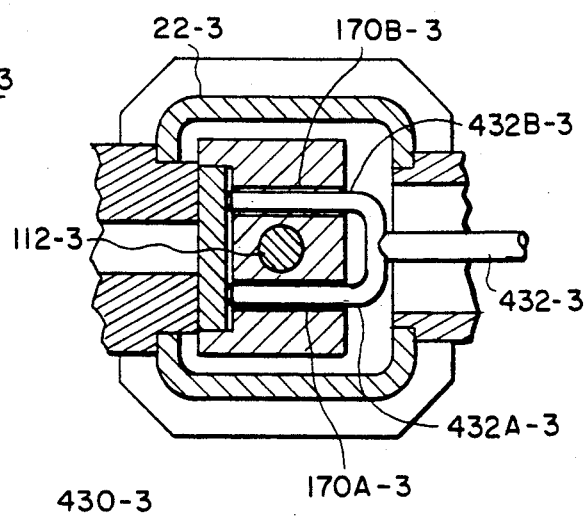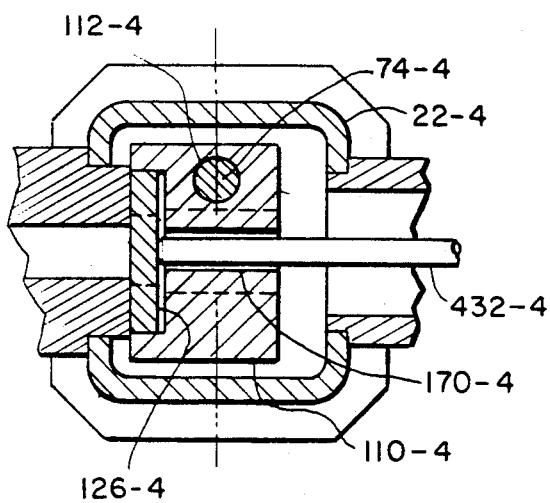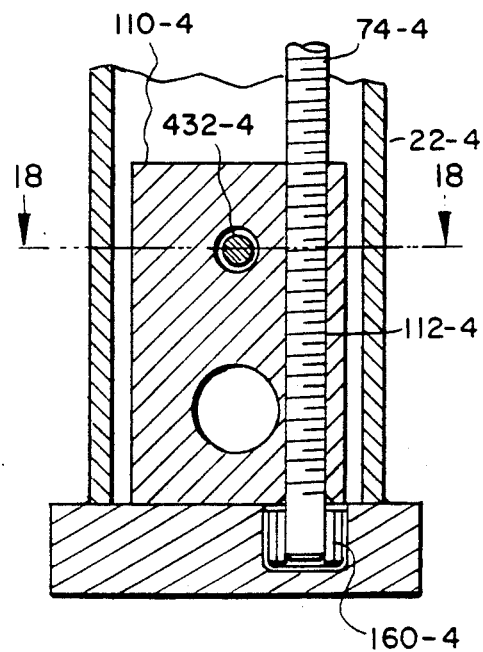

INCREMENTAL ELECTRICALLY ACTUATED VALVE

TECHNICAL FIELD

This invention generally pertains to electrically actuated valves and more specifically to electrically actuated expansion valves for refrigeration systems, providing constant incremental flow rate control.

BACKGROUND ART

Electrically actuated incremental valves suitable for use as expansion valves in refrigeration or air conditioning systems are typically comprised of two types. The first type typically includes a solenoid connected to an appropriate electrical supply which, in response to a pulsed electrical signal, actuates a plunger or control element alternately into and out of a flow path through the expansion valve body to permit or prevent fluid flow. The second type of electrically actuated expansion valve has a rotary actuator with means for converting the rotary motion into linear motion for operating a valve element to increase or decrease the flow area available through the valve body by seating against a valve seat to close the valve and prevent flow or moving linearly away from the valve seat to permit flow through an area defined by the area of the opening between the valve element and the valve seat. These are disadvantages associated with both types of electrically actuated valves which have been found difficult to overcome in the prior art.

The solenoid actuated expansion valves tend to cycle between completely open and completely closed, cycling at rate in the range of fractions of hertz to hundreds or thousands of hertz. Thus these valves often suffer from a shortened life span due to component fatigue and wear induced by the high cycle rate and corresponding speed and frequency of component movement required to maintain relatively smooth fluid flow through the refrigeration system. In addition, these valves, due to the open-closed cycle action, cause a pulsation in the fluid flow through the expansion valve body, often inducing stress and related failures of other components in the refrigeration system in which they are employed. Furthermore, the solenoid actuated expansion valves are susceptible to damage or even failure due to debris or foreign matter flowing through the refrigeration system coming into contact with the valve components during operation of the valve. Therefore, many have turned to the rotary actuated expansion valve.

The typical rotary actuated expansion valve is operated by a rotary stepping motor providing incremental rotary motion which is translated then to incremental linear motion to actuate a valve element in a linear axial fashion. Typically, the valve element is driven against the valve seat to sealingly cover an aperture, preventing fluid flow therethrough and closing the valve or alternatively is driven away from the seat to open the valve. The distance of the valve element from the valve seat determines the flow area available through the valve up to a maximum determined by the area of the aperture of the valve seat. Alternatively, in a second type of rotary expansion valve, the valve element may be a member which is driven to cover or uncover the inlet or outlet orifice in a line normal to the flow through the valve body. In this type of rotary actuated valve, the flow is determined by the amount of area of the flow orifice which is uncovered at any given time by the valve element.

These typical rotary actuated expansion valves have a tendency to stick, due to friction and the viscosity of contaminants collected upon the valve body. This sticking effect is compounded by the use of elastomeric or other non-metallic elements in typical valves, as is often necessary to provide necessary sealing between valve components. Overcoming this tendency to stick requires oversized, costlier motors and concurrently decreases the controllability of the system. This decrease in controllability results from the fact that the rotary actuator may fail to overcome the sticking of the valve element for one or more actuating pulses or steps, therefore causing the valve element to be improperly positioned. The controller for the valve, having sent a specified number of pulses intended to actuate the valve to a desired opening, will in fact have actuated the valve to a smaller degree than calculated or desired. The system then indicates the need for further opening of the valve, and the controller will begin to "hunt" for the appropriate setting of the valve.

This second type of rotary actuated expansion valve also typically is comprised of many relatively small parts which must be machined to close tolerances to prevent fluid leakage through the valve and to improve operating characteristics. However, such close tolerance machining is often expensive and time-consuming, as is the assembly of valves containing such parts. Furthermore, the second type of rotary actuated expansion valve often includes a relatively large number of elastomeric seals to prevent flow from bypassing the valve element, as well as one or more springs having a large traverse distance, all of which are susceptible to wear and breakage. These items tend to substantially decrease the reliability of the valve in that wear can cause leakage through the valve and sticking of the valve, with a corresponding loss of control and efficiency of the system in which the valve is applied, as well as increased maintenance and downtime costs.

It is an object of the present invention to provide a rotary actuated valve of simple construction.

It is a further object of the present invention to provide a rotary actuated valve which is highly reliable, with low maintenance requirements and costs.

It is yet another object of the invention to provide such a valve which is susceptible of mass production.

It is yet another object of the invention to provide such a valve which is relatively immune to the effects of foreign matter or debris flowing through the valve.

It is yet another object of the present invention to provide such a valve as will appropriately respond to a controller input to permit a smooth, pulse-free fluid flow through the valve.

It is yet another object of the invention to provide such a valve which is suitable specifically for such applications as an expansion valve in a refrigeration system.

These and other objects of the present invention will be apparent from the attached drawings and the description of the preferred embodiment that follows hereinbelow.

SUMMARY OF THE INVENTION

The present invention is an incremental, electrically actuated valve of the rotary actuator type, having a valve body with an internal metering chamber including at least two spaced interior surfaces, both of which are preferably planar. The valve body has an inlet orifice in one surface and an outlet orifice in the opposed, planar second surface. A valve element having a metering orifice is disposed operably between the two surfaces of the valve body, to sealingly close the outlet orifice, or conversely to meter flow to the outlet orifice through the metering orifice of the valve element in an amount determined by the combined exposed area of the metering orifice and outlet orifice. The valve element operates between the two surfaces, sliding linearly along and sealingly disposed against the planar outlet surface by inlet fluid pressure. Linear actuation of the valve element by the rotary stepper motor is accomplished by a shaft extending through and rotating in bearings at opposing ends of the valve body. A drive key on the shaft interfits a corresponding slot in the valve element and converts rotary motion of the shaft to linear motion of the valve element.

DESCRIPTION OF THE DRAWINGS

FIG. 1 shows a cross-sectional view of the valve of the subject invention.

FIG. 2 shows a partial cross-sectional view of FIG. 1 taken along section line 2-2.

FIG. 3 shows a view of the valve subassembly and motor.

FIG. 4 shows a perspective view of the metering piston and drive key of the valve of FIG. 1.

FIG. 6 shows a cross-sectional view of the preferred embodiment of the valve in a closed, flow preventing condition.

FIG. 10 shows in perspective view as second alternative embodiment of the valve subassembly of the subject invention.

FIG. 11 shows the drive element and metering element of the alternative embodiment.

FIG. 12 shows a cross-sectional view of the drive element and metering element taken along section line 12-12 of FIG. 11.

FIG. 13 shows a cross-sectional view of the valve embodying the alternative embodiment.

FIG. 15 shows a cross-sectional view of a fourth alternative embodiment of the valve which includes a alternative embodiment of the means for securing the metering piston.

FIG. 16 shows a cross-sectional view of FIG. 15 taken along section line 16-16.

FIG. 17 shows a partial cross-sectional view of a fifth alternative embodiment of the valve.

FIG. 18 shows a cross-sectional view of FIG. 17 taken along section line 18-18.

DESCRIPTION OF THE PREFERRED EMBODIMENTS

Figure 7:
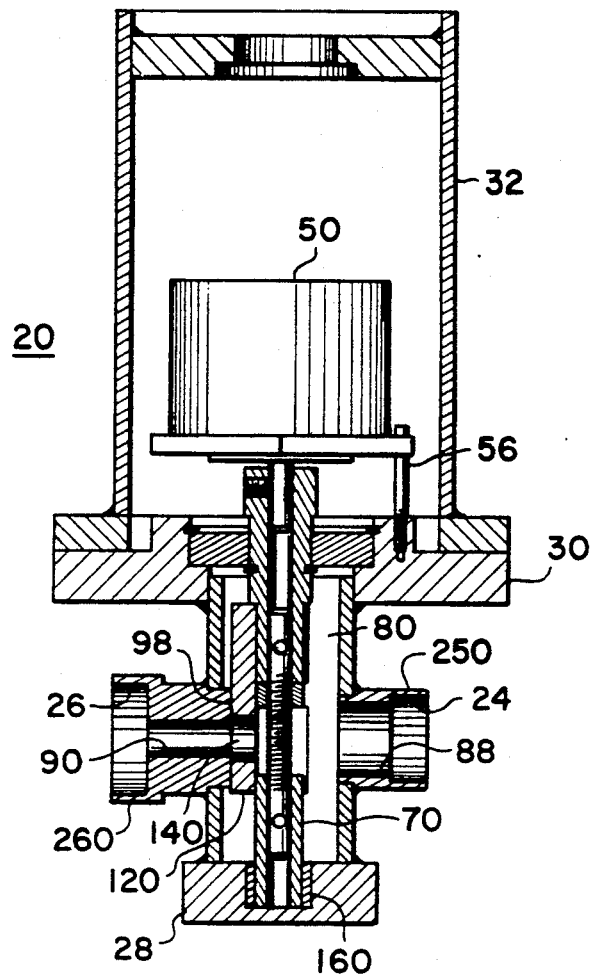
FIG. 7 shows a cross-sectional view of an alternative embodiment of the valve of FIG. 1.

This Application is a continuation in part of co-pending United States Patent Application, U.S. Ser. No. 07/406,218.

A valve according to the subject invention generally denoted by reference numeral 20 is shown in cross-sectional view in FIG. 1. For purposes of discussion, the orientinon shown of the valve 20 is treated as upright, but it must be appreciated that this is exemplary only. The terms "vertical", "horizontal", "upward", and "downward" are used herein with reference to the valve 20 as shown in the drawings, and do not refer to the actual external orientation of the valve 20.

The valve 20 has a valve body 22 with an inlet connection aperture 24 and an outlet connection aperture 26 for permitting flow through the valve body 22. The valve body 22 terminates at one end in a base 28 and has a motor mounting plate 30 at the opposing end. A motor housing 32, which is comprised of a cylindrical motor cover 34 welded to a planar, annular cover base 36, is secured to the motor mounting plate 30. The motor housing 32 is secured to the motor mounting plate 30 by means of welding or bolts (not shown) extending through corresponding bores in the motor mounting plate 30 and the cover base 36.

In the preferred embodiment, the motor cover 34 also includes a cover end plate 42 welded thereto, the cover end plate 42 having a central aperture 44 through which power and control wiring (not shown) may communicate from the exterior to the interior of the motor housing 32. The motor cover central aperture 44 is preferably sealed by a suitable sealant to prevent contaminants from entering the motoring housing 32. Those skilled in the art will recognize that the aperture 44 for admitting power and control wiring may be provided in other locations on the motor housing 32, and that the motor housing 32 may be alternatively constructed. For example, the motor cover 34 and the cover end plate 42 may be a press-formed unitary component welded to the planar cover base 36, or the motor cover 34 and the planar cover base 36 may be a press-formed unitary component welded to the cover end plate 42. It will be apparent to those skilled in the art that there are many methods of constructing the valve 20 and its various components which could accomplish the same results.

A motor 50 having a stator (not shown) and a rotor (not shown) disposed within a generally cylindrical shell 52 is secured within the motor housing 32. As shown more clearly in the partial cross-sectional view of FIG. 2, the shell 52 includes a planar motor base 53 of rectilinear outline, with holes 54 disposed therethrough adjacent each corner of the motor base 53 outside the exterior radius of the shell 52. The motor 50 is an incremental motor, also interchangeably known as a stepping motor or stepper motor, providing rotary motion in equal radial increments in response to the application of an external control or power signal. It is believed that this type of motor 50 is well known to those skilled in the art and that no discussion in further detail need be included herein.

An anti-rotation pin 56 positionally secures the motor 50 to prevent rotation of the motor stator and shell 52 within the motor housing 32. The anti-rotation pin 56 extends through one of the holes 54 in the motor base 53 and into a corresponding threaded mounting hole 58 in the motor mounting plate 30. Since the purpose of the anti-rotation pin 56 is to prevent only rotation of the shell 52, the hole 54 must be a clearance hole with respect to the pin 56 so that nutation and some axial motion of the shell 52 may occur without interference. It will be readily apparent to those skilled in the art that the motor 50 may vary from the embodiment described herein so long as provision is made for suitable means to prevent rotation of the shell 52.

The motor 50 also has a centrally disposed motor drive shaft 62 extending from the motor base 53 oppositely from the shell 52. The lower end of the drive shaft 62, as seen in FIG. 2, extends into and is fixed in a central bore 68 in a valve subassembly 70. The valve subassembly 70 is discussed in greater detail hereinafter.

The valve body 22 has an internal metering chamber 80 defined by a first or inlet wall 82 and a spaced second or outlet wall 84. Preferably, two valve body side walls 86 join the first wall 82 and the second wall 84 to define a valve body 22 which has a substantially rectilinear cross-section when taken along a plane normal to the axis of the drive screw 74. The first, inlet wall 82 has an inlet aperture 88 and an outlet aperture 92 is provided in the second, outlet wall 84. The inlet aperture 88 and outlet aperture 92 are shown as coaxial only for purposes of discussion and those skilled in the art will recognize that many various dispositions of the inlet aperture 88 and outlet aperture 92 are possible.

Preferably, the outlet wall 84 includes a metering face portion 98 extending a small distance into the internal metering chamber 80 and an inner surface portion 100. This distance would preferably be in the range of 0.020 inches to 0.060 inches. It should be noted that the metering face 98 could also be coplanar with the inner surface 100 of the second or outlet wall 84.

Figure 5:
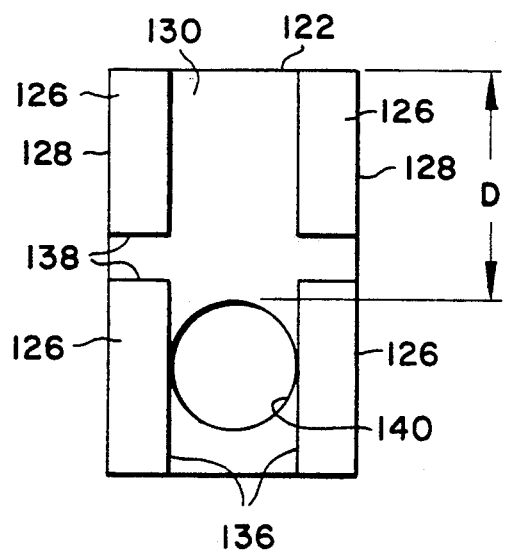
FIG. 5 shows the metering piston and metering orifice.
Figure 9:
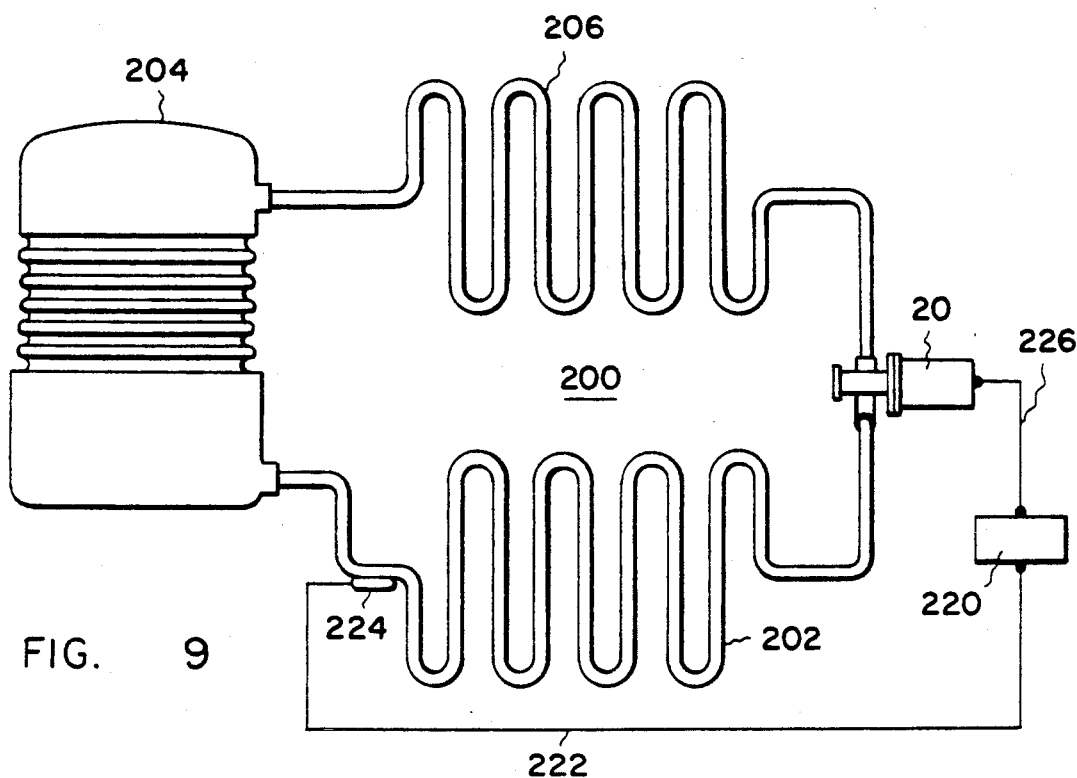
FIG. 9 shows in schematic representation a refrigeration system in which the subject invention may suitably be employed.
Figure 8:
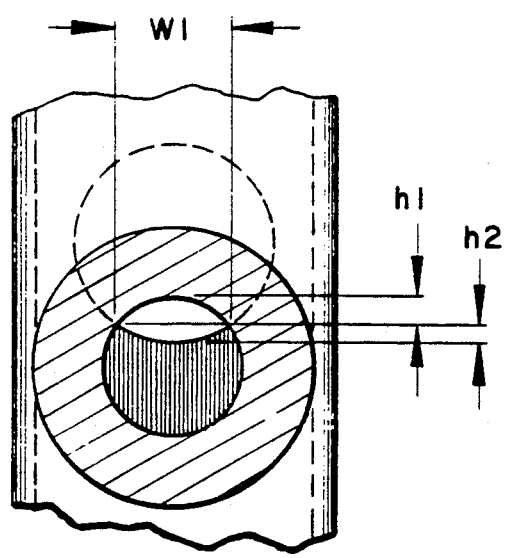
FIG. 8 shows the available flow area in one intermediate flow position of the preferred embodiment.

The valve subassembly 70, mated to the drive motor 50, shown in FIG. 3 apart from the valve body 22 for greater clarity and in FIGS. 1, 4, and 5 in cross-sectional view, is comprised of several components. The valve subassembly 70 includes an upper carrier element 72, a threaded drive shaft 74, and a lower carrier element 76. The drive shaft 74 is disposed between the upper carrier element 72 and the lower carrier element 76.

A drive key 110 is operably disposed on the drive shaft 74 and includes a centrally disposed bore 112 threaded to correspond to the threads on the drive shaft 74. Preferably, the drive key 110 is rectilinear in form, having an upper drive surface 114, an oppositely facing lower drive surface 116, and an edge 118 connecting between the upper drive surface 114 and the lower drive surface 116, as shown in FIGS. 3 and 4.

The valve subassembly 70 also includes a valve element or metering piston 120. The preferred embodiment of the metering piston 120 is particularly disclosed in FIGS. 4 and 5. Prefereably, the metering piston 120 is rectilinear or substantially so, having a piston body 122 defined by a planar metering surface 124, a spaced, opposed planar surface 126 and two spaced sidewalls 128 joining between the metering surface 124 and the biasing surface 126. The planar surface 126 is subdivided into four parts by two channels or slots, a larger vertical slot 130 and a relatively smaller horizontal slot 132, formed intersectingly in the piston body 122. The channels 130 and 132 are preferably the same depth and are defined by a common channel bottom, a cross-shaped planar inner surface 134 which is spaced between and parallel to both the metering surface 124 and planar surface 126. The sides of the larger, vertical slot 130 are defined by spaced, opposed vertical walls 136, and the sides of the smaller, horizontal slot 132 are defined by spaced, opposed horizontal walls 138. The larger slot walls 136 are spaced to accommodate freely the drive shaft 74, and the smaller slot walls 138 are spaced to closely to act as a means for engaging and accepting the drive key 110 for driving engagement between the upper drive surface 114 and the lower drive surface 116 and the slot walls 138. Preferably the drive key 110 is accepted into the horizontal slot 132 with only a few ten-thousandths or one-thousandths of an inch vertical clearance.

A bore defining a metering orifice 140 in the metering piston 120 permits flow communication from the channel bottom 134 to the metering surface 124. A clearance chamber (not shown) may be provided in the metering orifice 140 adjacent the metering surface 124 to prevent any contaminants such as dirt or particulate matter in fluid flowing through the valve 20 from interfacing with the normal operation of the valve 20.

The preferred embodiment of the metering piston 120 is shown in a perspective view normal in FIG. 4. The metering piston 120 is preferably rectilinear and slightly smaller in external dimensions than the dimensions of the internal metering chamber 80 to ensure that the metering piston 120 is non-rotatable in the metering chamber 80. Preferably the metering chamber 80 is also rectilinear, however, the metering chamber 80 may alternatively include curved or hemispheric side walls 86 joining between a planar inlet wall 82 and a planar outlet wall 84, or may include contiguously curved side walls 86 and inlet wall 82. The preferred valve body 22 may be diecast or forged with an integral base 28, or alternatively be made from square steel tube stock or from round steel tube with one or more rolled-flat surfaces with a separate base 28 welded thereto.

The lower carrier element 76 is preferably tubular, having a cylindrical exterior 150, a cylindrical interior 152 sized to accept the drive shaft 74, and a stop shoulder 154 comprising the upper end. A roll pin or similar member 156 extends through corresponding bores 158 in the lower carrier element 76 and proximate the lower end of the drive shaft 74 to ensure concurrent rotation and to fix the position of the drive shaft 74 within the lower carrier element interior 152.

A lower main bearing 160 is interposed to provide rotational bearing support between the lower carrier element and a bore 162 in the base of the valve body 22. Preferably, the lower main bearing 160 is a tubular element formed, for example, of sintered bronze or similar materials. It will be apparent to those skilled in the art that other types of bearings such as ball or roller bearings would be equally suitable for use in the valve 20, depending upon the size of the valve 20 and its expected operating life.

The upper carrier element 72 is comprised of several portions of various exterior diameters and a centrally disposed vertical internal shaft bore 166 for accepting the motor drive shaft 62 and the drive shaft 74. A first portion 168 disposed at the upper end of the upper carrier element 72 includes a threaded set screw bore 170 in which a correspondingly threaded set screw 172 is provided. The set screw 172 is tightened in the set screw bore 170 against the motor drive shaft 62 to ensure concurrent rotation and to positionally fix the motor drive shaft 62 so as to support the weight of the motor 50.

A horizontal annular bearing shoulder 176 forms the lower end of the first upper carrier portion 168, joining a slightly smaller diameter second portion 178 about which is disposed an annular upper main bearing 180. The upper main bearing 180 as shown is composed of a solid material such as sintered bronze, but other types of bearings, such as ball or roller type bearings could also be suitably employed. A groove 182 is provided near the lower end of the second portion 178 in which a snap ring or other retaining means 184 is disposed for retaining the upper main bearing 180 upon the second diameter portion 178.

A smaller diameter third portion 190, which is preferably substantially the same diameter as exterior surface 150 of the lower carrier element 76, forms the lower end of the upper carrier element 72. As with the lower carrier element 76, the drive shaft 74 is retained and positionally fixed within the central bore 166 to ensure concurrent rotation. Preferably, a roll pin 192 is provided in corresponding bores 194 in proximate the upper end of the drive shaft 74 and the third portion 190, although other means such as direct bonding by welding, for example, may be used. In any case, it is necessary to ensure that the motor drive shaft 62, upper carrier element 72, drive shaft 74 and lower carrier element 76 rotate concurrently. A planar stop shoulder 195 at the lower end of the third portion 190 forms the lower end of the upper carrier element 72.

Those skilled in the art will recognize that some components of the valve subassembly 70 could be unitary, such as the lower valve carrier 76 and the drive shaft 74, or the upper valve carrier 72 and the drive shaft 74. Those skilled in the art will also recognize that there are many means of forming the valve subassembly 70 which will comprise the required means for mounting the drive shaft 74 and for providing substantial axial rigidity of the drive shaft 74 during rotation thereof. The term "substantial axial rigidity" is used to refer to the fact that the valve subassembly 70 is fixed within the internal metering chamber 80 of the valve body 22 so that no movement or no substantial movement of the drive shaft 74, and of the upper and lower carrier elements 72 and 76, can occur other than the desired rotary motion about the axis of the drive shaft 74.

Preferably the valve body 22 includes in the internal metering chamber 80 a circular upper bore 196, sized to accept the upper main bearing 180, and which terminates in an upward facing shoulder 197. The valve subassembly is disposed in the internal metering chamber 80 with the lower main bearing 160 in the bore 162 of the base 28 and the upper main bearing 180 within the circular upper bore 196, seated on and supported by the shoulder 197. The shoulder 197 also carries the weight of the motor 50, transmitted through the motor drive shaft 62, upper carrier element 72, and upper main bearing 180. An upper snap ring or similar retaining means 198 in a corresponding groove 199 in the circular upper bore 196 fixes the valve subassembly 70 within the internal metering chamber 80 and allows easy removal thereof for any maintenance or other servicing. The combination of the shoulder 197 and snap ring 198 also ensures that the valve assembly 70 is unable to move vertically during rotation of the motor 50. Also, since the weight of the motor 50 is carried by the shoulder 197, any inherent axial misalignment of the motor 50 will be observed only as nutation of the motor end plate 53 and will cause stress in the components of the valve subassembly 70 or misalignment of the valve body 120 with respect to the outlet aperture 90.

The valve 20 may be incrementally moved between a fully closed position, as depicted in FIG. 6, and a fully open position, as depicted in FIG. 1. The metering piston 120 is actuated between these positions by the incremental rotary action of the stepping motor 50. As the motor 50 is stepped or incrementally rotated, the drive screw 74 is rotated. The incremental rotation motion of the drive screw 74 is translated through the engagement between the drive screw 74 and the threaded bore 112 of the drive key 110 into incremental linear motion of the drive key 110. The incremental linear motion of the drive key 110 causes a like linear movement of the metering piston 120 within the internal metering chamber 80. In other words, to cause a linear motion of the metering piston 120 upwards, the drive screw 74 is rotated in a first direction and the drive screw 74 is oppositely rotated to cause a downward linear motion of the metering piston 120. It will be apparent to those skilled in the relevant art that the motor 50, the drive screw 74, and the drive key 110 comprise a means for incrementally moving the metering piston 120 to position the metering piston 120 as desired.

In the fully closed position, the metering piston 120 is driven downward so that the metering surface 124 is disposed across and completely closes the outlet aperture 90. Preferably, this corresponds with the lower drive surface 116 contacting the stop shoulder 154 of the lower carrier element 76 to limit downward movement of the drive key 110 and the metering piston 120 and thereby ease calibration of the valve 20. In this position, flow is prevented from the internal metering chamber 80 to the outlet bore 96, preventing fluid flow through the valve 20.

In the fully opened position, the metering piston 120 is driven linearly upward by the drive screw 74 and drive key 110 so that the metering orifice 140 is disposed adjacent the outlet bore 96. Preferably, this corresponds with the upper drive surface 114 of the drive key 110 contacting the lower end 195 of the upper carrier element 72, again to limit upward travel of the drive key 110 and of the metering piston 120 and ease calibration of the valve 20. This permits fluid flow from the inlet aperture 88 through the metering orifice 140 to the outlet bore 96 at the maximum flow rate of the valve, as determined by the smaller of the metering orifice 140 and the outlet bore 96 and the pressure of the fluid at the inlet aperture 88.

The flow of fluid through the valve is varied by driving the metering piston 120 incrementally upward toward the full open position from the fully closed position. This permits an aperture defined by the outlet bore 96 and the metering orifice 140 to determine the instantaneous rate of fluid flow at a given fluid pressure at the inlet aperture. By driving the metering piston 120 upwards or downwards, the area thus defined and the flow rate through the valve 20 controlled thereby is selectively varied. This is more fully discussed hereinbelow. Also, those skilled in the art will recognize that because the instantaneous flow rate through the valve 20 is constant at any given opening position and fluid pressure, the fluid flow through the valve 20 is free from induced pulsations capable of causing pressure shock related damage to the system in which the valve 20 is employed.

The fluid pressure at the inlet aperture 88 and in the internal metering chamber 80 serves to bias the metering surface 124 against the metering face 98. This biasing effect or force results from the fluid pressure differential across the valve 20 between the relatively high pressure at the inlet 88 and the lower pressure at the outlet 90. The fluid pressure biasing force is sufficient in refrigeration system applications and in many other applications as well to maintain a sealing force between the metering piston 120 and the metering face 98. In the closed position, the metering surface 124 of the metering piston 120 is placed immediately adjacent to and over the outlet bore 96 in a flow preventing manner in the area defined by the dimension D, which exceeds the diameter of the outlet bore 96.

Figure 14:
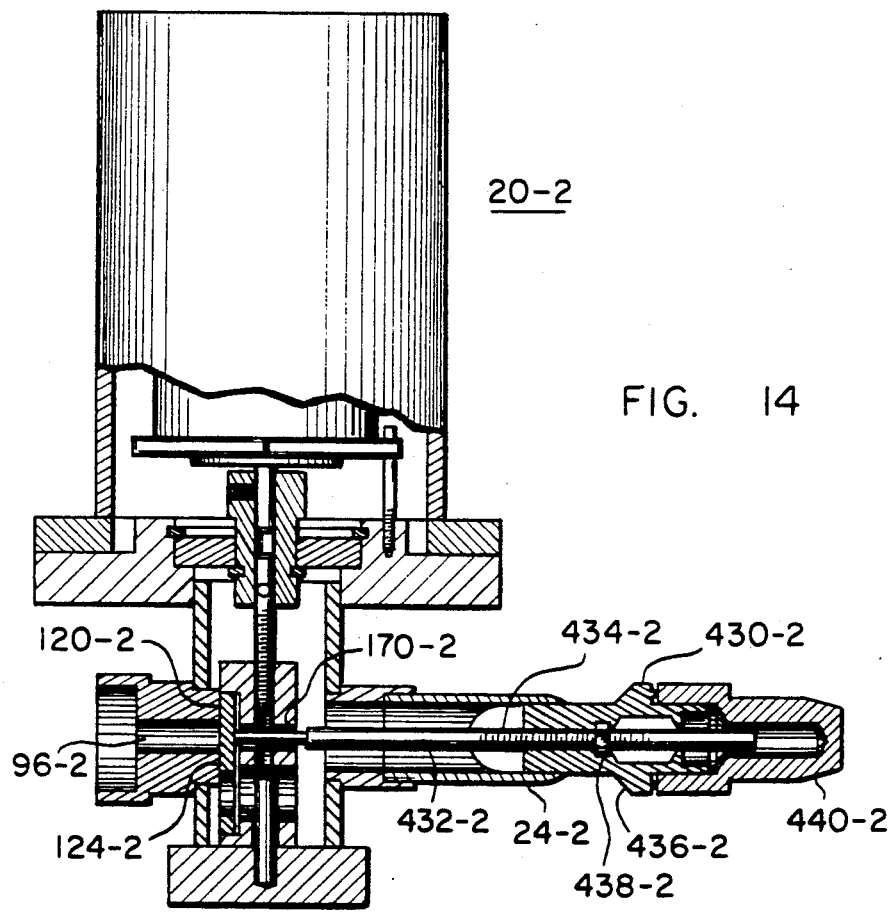
FIG. 14 shows a cross-sectional view of a third alternative embodiment of the valve which includes a means for securing the valve metering piston.
Figure 19:
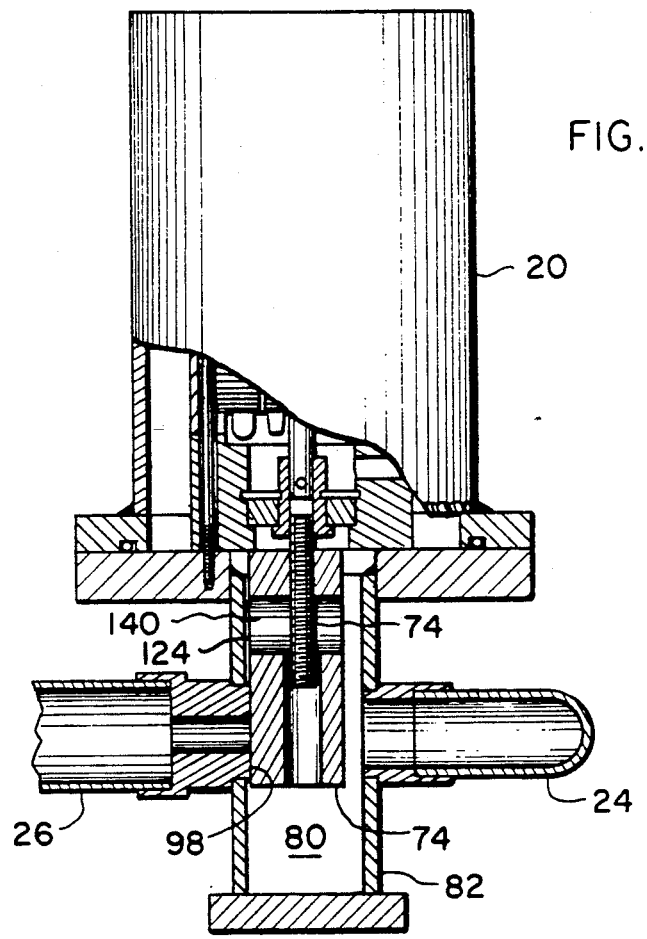
Figure 20:
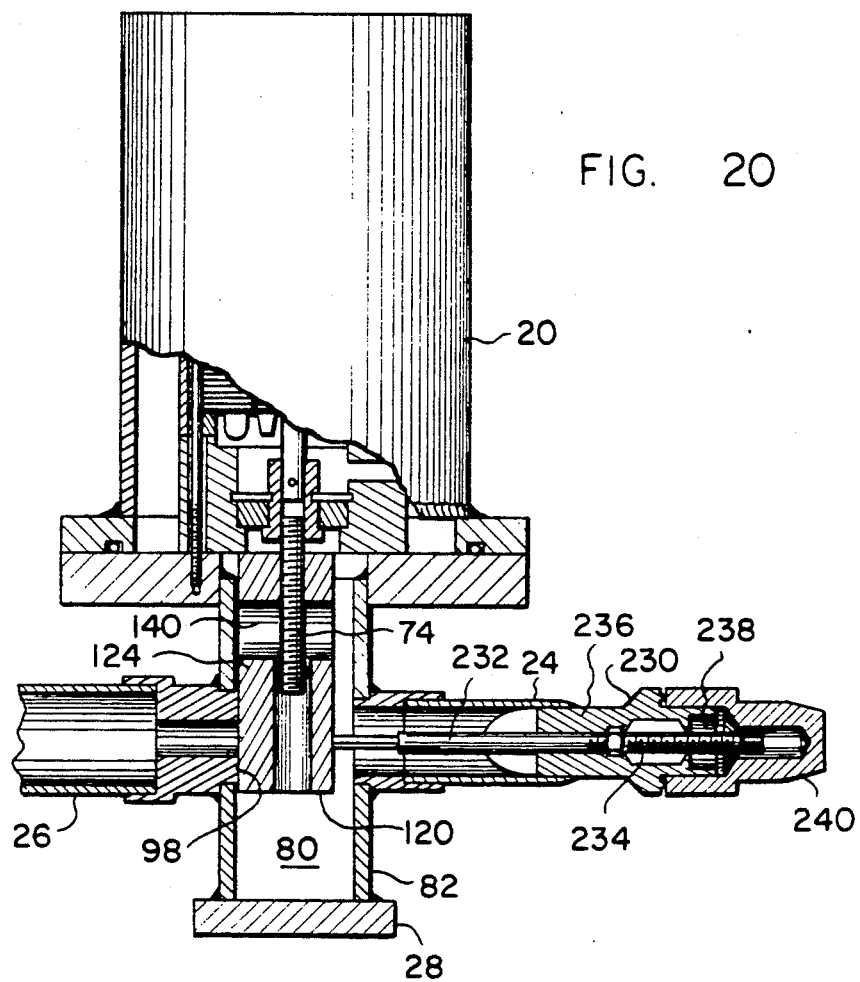

The preferred embodiment of the valve 20 produces a non-linear rate of change of the flow area defined by the area of the metering orifice 140 exposed to the outlet bore 96 at any given position of the metering piston 120. As shown in FIG. 14, this area is the sum of two chords of width W1 as determined by the instantaneous position of the metering piston 120. The first chord is of width W1 and height H1, based on the diameter of the outlet bore 96, and the second chord is width W1 and height H2 based upon the diameter of the metering orifice 140. As the width W1 varies non-linearly with a constant linear movement of the metering piston 120, the preferred embodiment provides a non-linear rate of change.

The metering orifice 140 in the preferred embodiment is a circular bore, however, alternative geometric configurations would also be suitable. It will be readily apparent to those skilled in the art that a wide variety of combinations of geometric shapes of the outlet bore 96 and metering orifice 140 exist, each of which will produce a unique flow area and fluid flow rate at any given position, and that there are many combinations of linear and non-linear rates of change of fluid flow area in response to a constant linear movement of the metering piston 120. Also, it will be recognized that the sizes of the outlet bore 96 and metering orifice 140 can be readily changed as well to accommodate a wide variety of applications and fluid flow rates.

Preferably, the valve 20 of the subject invention would be employed as a variable flow rate expansion valve in a refrigeration system 200 for controllably circulating refrigerant in a closed loop connection. The refrigeration system 200, as shown in schematic form in FIG. 13, is comprised of a variable flow rate expansion valve 20 for providing a controlled flow rate and expansion of the refrigerant, an evaporator 202 in flow connection with the valve 20 for gasifying the expanded refrigerant, a compressor 204 in flow connection with the evaporator 202 for receiving and compressing the gasified refrigerant, and a condenser 206 in flow connection with the compressor 204 for receiving and liquefying the refrigerant from the compressor 204. The valve 20 is also in flow connection with the condenser 206 for receiving and controllably expanding the liquefied refrigerant. It is, of course, readily apparent to those skilled in the art that the evaporator 202 and the condenser 206 could be of any suitable design, such as a fin and tube design. It will be equally apparent to those skilled in the art that there is a large variety of suitable compressors 204, such as scroll or piston compressors, which could be suitably employed in the refrigeration system 200.

A controller 220 is connected by a first wiring harness 222 to a sensor 224. The sensor 224 is disposed at the evaporator 202 to determine either the outlet pressure or outlet temperature of the refrigerant from the evaporator 202. A second wiring harness 226 connects the controller 220 to the valve 20 to enable at least the transmission of control signals from the controller 220. It is believed that such systems are well known to those skilled in the art and need not be explained in detail herein.

While the normal operation of the preferred embodiment of the valve 20 is described hereinbelow as employed in the refrigeration system 200 for clarity of description, this should not be taken as limiting, but rather as exemplary of a suitable application of the valve 20. It will be readily apparent to those skilled in the art that the valve 20 would be equally suitable for other applications. For purposes of the description of the normal operation of the valve 20 in such an application, particular reference whould be had to FIGS. 1 and 6.

Specifically, as employed in the refrigeration system 200, the valve 20 would be driven to the fully closed position as shown in FIG. 6 when the compressor 204 is inoperative. When additional refrigeration is required, the compressor 204 is activated to compressor refrigerant. The controller 220 will then activate the stepper motor 50 to rotatably increment and thereby linearly move the metering piston 120 to the full open position as shown in FIG. 1, or to a partially open intermediate position if desired.

Preferably, the full open position will be maintained until the sensor 224 indicates through the first wiring harness 222 to the controller 220 that the condition specified by the controller 220 has been attained. The controller 220 will then transmit the appropriate signals to the stepper motor 50 to incrementally rotate and linearly increment the metering piston 120 to an intermediate or partly open position providing a reduced flow area as defined by the aperture bounded by the cross sectional area of the metering orifice 140 exposed to the outlet bore 96. The required cross sectional area will vary according to refrigeration load imposed by the ambient temperatures acting upon the evaporator 202 and the condenser 206 and the desired amount of cooling.

For example, should the sensor 224 measure a pressure or temperature indicating that undesirable flooding of the evaporator 202 is occurring, the controller 220 will activate the stepper motor 50 to linearly increment the metering piston 120 to the closed position as shown in FIG. 6. Then, when the transient flooding condition of the evaporator 202 has ceased, the controller 220 will activate the valve 20 to linearly move the metering piston 120 to a selected intermediate open position.

The refrigeration system 200 can continue in this form of operation as long as the demand for refrigeration continues. It is believed that no in-depth discussion of the principals of refrigeration system operation need be undertaken herein, as such systems are generally well known to those skilled in the art.

One alternative embodiment of the valve 20 is shown in FIG. 7. As shown, this embodiment includes all the elements and components described above with the exception that the inlet aperture 88 and outlet aperture 90 and the metering surface 98 are provided by an inlet collar 250 and an outlet collar 260, respectively. Both the inlet collar 250 and the outlet collar 260 are preferably tubular members formed, for example, of steel, having exterior diameters sized to accommodate the desired inlet connection aperture 24 diameter and outlet connection aperture 26 diameter and provide the required wall thickness as determined by the operating pressures of the valve 20. The inner end of the outlet collar 260 is milled or ground flat and extends into the metering chamber 80 to form the metering surface 98. The inlet collar 250 and outlet collar 260 must be inserted into and sealably affixed to the valve body 22 in suitably sized apertures 252 and 262, respectively, which may be accomplished by welding or other bonding means. This is necessary to provide the required flow connection through the valve body 22. It will be noted also that the alternative embodiment of the valve 20 shown in FIG. 7 includes the valve body 22 having a separate welded base 28 as discussed above. In operation and in all other respects, the valve 20 as shown in FIG. 7 will be identical with that of the preferred embodiment.

It should be noted that when the same item or feature is shown in more than one of the figures, it will be labeled with the corresponding reference numeral to aid in the understanding of the subject invention. Furthermore, reference should be had to all of the figures necessary to aid in the understanding of the specification even where a particular figure is referred to, as all reference numerals are not displayed in all figures in order to minimize confusion and aid in clarifying the subject invention. When the same item or feature does appear in a figure representing or disclosing an alternative embodiment of that part or feature, a numeric suffix to correspond with the designation of that alternative embodiment in the specification is appended to the reference numeral. The numeric designation of the alternative embodiment does not correspond to its preference but rather is intended to aid in the understanding of the subject invention.

A second alternative embodiment is disclosed in FIGS. 10-13. In this embodiment, the surface 126-1 of the metering piston 120-1 is flat rather than subdivided into the vertical slot 130 and the horizontal slot 132, with the metering piston 120-1 sized to interfit a corresponding piston recess 280-1 in the drive key 110-1. The piston recess 280-1 is generally rectilinear and is defined by a backplane or bottom 282-1 surrounded by walls comprising a lower drive surface 128-1 at the top edge for driving the metering piston 120-1 downward, an upper drive surface at the bottom edge for driving the metering piston 120-1 upward, and connecting walls 180-1. These walls are preferably slightly wider than the width of the metering piston 120-1 to permit some compliant movement of the metering piston 120-1 within the piston recess 280-1, and the metering piston 120-1 is enclosed or substantially-enclosed compliantly by the drive key 110-1 so that the metering surface 124-1 remains in proper registration with the metering face 98-1.

A transmission bore 284-1 communicates through the drive key 110-1 to the backplane 282-1 to permit fluid flow into the piston recess 280-1, to act against the biasing surface 126-1 and to flow through the metering orifice 140-1. The drive key 110-1 also includes an upper key stop surface 286-1 for contacting the stop shoulder 195-1 to limit the upward travel of the drive key 110-1 and a lower key stop surface 288-1 for limiting the downward travel of the drive key 110-1.

According to the alternative embodiment, the drive shaft 74-1 is truncated and the function of the lower carrier element is fulfilled by a guide pin 300-1 which is fixed in an aperture in the valve body base 28-1. In order to accommodate the guide pin, the lower portion of the bore 112-1 includes a smooth surface for sliding engagement with the guide pin 300-1 to provide support during linear motion of the drive key 110-1. As shown in FIG. 13, the base 28-1 and the mounting plate 30-1 are separately formed and affixed by such means as welding to the valve body 22-1. The base 28-1 also includes an upper surface acting as the lower stop surface 154-1.

Also according to the alternative embodiment, the valve body 22-1 is provided with an inlet collar 310-1 and an outlet collar 312-1. These collars 310-1 and 312-1 permit the use of a valve body 22-1 having thinner sidewalls than that shown in FIG. 1 for the preferred embodiment. The inlet collar 310-1 is provided with the inlet connection aperture 24-1 and the inlet aperture 88-1, while the outlet collar 312-1 is provided with the outlet aperture 90-1 and the outlet connection aperture 26-1, and also extends into the metering chamber 80-1 to present the metering face 98-1.

Those skilled in the art will recognize that features of the collars 310-1 and 312-1, the alternative base 28-1, and the alternative mounting plate 30-1 may be applied to the preferred embodiment of the valve 20 in any combination, and likewise that the features of the valve body 22 of the preferred embodiment may be applied to the alternative embodiment of the valve.

In operation, the valve 20-1 of the alternative embodiment operates in a manner substantially identical with that of the preferred embodiment. In order to reach the fully opened position, the drive key 110-1 is driven upward until the lower end 195-1 of the upper carrier element 72-1 is contacted, at which point full flow is permitted through the metering orifice 140-1 and into the outlet aperture 90-1. The drive key 110-1 is likewise driven downward to obtain the fully closed position, contacting the stop surface 154-1 so that the metering surface 124-1 covers the outlet aperture 90-1, preventing flow therethrough. Metered flow is obtained at positions between fully opened and fully closed, with the flow depending upon the outlet aperture exposed.

FIG. 14 disclose yet another alternative embodiment of the valve 20. A selectively operable axial closure device 430-2 is disposed in the tubing 24-2. The axial closure device 430-2 is comprised of a lock member 432-2 having a drive thread portion 434-2 operating linearly in the device body 436-2. A seal 438-2 disposed within the closure device body 436-2 prevents the flow or leakage of fluid from within the inlet tubing 24-2. An actuating knob 440-2 is provided for causing rotary motion of the lock member 432-2 in response to manual rotation of the actuating knob 440-2.

In operation, the valve operates normally in all respects as described above, however, when the valve is in the full closure position the actuating knob 440-2 may be rotated to cause the lock member 432-2 to advance linearly through the small guide bore 170-2 provided in the drive key 110-2. The lock member 432-2 is advanced into a biasing contact with the planar surface 126-2 of the metering piston 120-2 to forcibly seat the metering piston 120-2 and thereby cover the outlet bore 96-2. The valve 20-2, when equipped with the alternative axial closure device 430-2, selectively acts as a positive backflow preventing shutoff valve. This permits removal of fluid from the inlet tubing 24-2, which in turn aids in the servicing and maintenance of the systems to which such a valve 20-2 is applied.

FIGS. 15 and 16 show a fourth alternative embodiment of the valve 20. In this embodiment, the axial closure device 430-3 includes a lock member 432-3 having divided end portions 432A-3 and 432B-3. Two corresponding guide bores 170A-3 and 170B-3 are also provided, through which the two respective divided end portions 432A-3 and 432B-3 extend to forcibly seat the metering piston when the metering piston is in the full closed position. These guide bores 170A-3 and 170B-3 are parallel and are disposed aside from the drive shaft bore 112-3, preferably equidistantly, rather than intersecting the bore 112-3, as in the previous embodiment shown in FIG. 14. By employing the two guide bores 170A-3 and 170B-3 along with the divided end portions 432A-3 and 432B-3, it is possible to provide an axial closure device 430-3 in an embodiment of the valve 20-3 where the drive screw 74-3 extends the full length of the valve body 22-3 and into bearing 160-3. There are no operational differences between the previous embodiment and this alternative embodiment.

A fifth alternative embodiment of the valve 20-4 is shown in FIGS. 17 and 18. These figures disclose another alternative embodiment in which it is possible to employ a drive screw 74-4 which extends through the valve body 22-4 into the bearing 160-4. This is accomplished by arranging the bore 112-4 in an offset position with respect to the centerline of the drive key 110-4, on which the guide bore 170-4 and the metering passage 140-4 are preferably arranged. It is also possible to reduce the overall width of the drive key 110-4 by forming the guide bore 170-4 and the metering passage 110-4 in offset positions with respect to the centerline of the drive key 110-4. The lock member 432-4 can freely extend through the guide bore 170-4 and contact the planar surface 126-4 without interfering with the offset drive screw 74-4 since the drive shaft bore 112-4 and the guide bore 170-4 do not intersect. In other respects, the operation of the alternative embodiment valve 20-4 is substantially identical with the previously disclosed embodiments.

Preferably, the components of the valve 20 are constructed of suitable steel alloys. The metering face 98 of the interior outlet wall 86 or of the outlet collar 94 is milled or ground flat, as is the metering surface 124 of the metering piston 120. Also, the drive key 110 engages the metering piston 120 in a compliant manner to permit horizontally compliant movement of the metering piston 120 within the metering chamber 80. This compliant movement of the metering piston 120 will permit the intermittent passage of debris or particulate matter through the valve 20 by enabling the metering piston 120 to disengage the metering face 98 should debris or particulate matter intrude therebetween. Should this occur, inlet pressure fluid will pass through the gap thus created and flush the debris or particulate matter into the outlet bore 96. In the absence of the debris or particulate matter, the metering piston 120 will again be seated against the metering face 98, thereby preventing inaccurate operation of or failure of the valve 20.

It will be readily apparent to those skilled in the art that the valve 20 provides an incremental, rotary actuated variable flow rate valve which is of simple construction and highly reliable in operation. It is also apparent that the valve 20 is readily susceptible of mass production, having only a very minimal requirement for close machining tolerances, and therefore being low in initial cost and in maintenance requirements and costs.

Finally, it should be noted that the valve 20 is readily suitable for application in systems having a fluid pressure differential between the inlet and outlet of the valve, such as a refrigeration system, in which the valve 20 serves as a rotary actuated expansion valve to permit a smooth, pulse free fluid flow through the valve with relative immunity to effects from foreign matter or debris. Therefore, the valve 20 provides a substantial advance in the state of the art of electrically actuated variable flow rate valves and provides substantial advantages over the known prior art.

Modifications to the preferred embodiments of the subject invention will be apparent to those skilled in the art within the scope of the claims that follow hereinbelow.

What is claimed is:

1. A variable flow rate valve comprised of:
   a valve body defining an internal metering chamber, said valve body having a first wall with an inlet aperture for permitting fluid flow into said metering chamber and a second wall including a substantially planar outlet surface with an outlet aperture for permitting fluid flow from said metering chamber;
   a threaded drive shaft disposed in said metering chamber;
   means for rotationally supporting said drive shaft in substantial axial rigidity;
   means for incrementally rotating said drive shaft;
   a substantially rectilinear metering piston disposed in said metering chamber in sliding engagement with said planar outlet surface, said metering piston having a metering orifice; and
   a drive key for converting rotation of said drive shaft to linear movement of said metering piston, said drive key in engagement with said drive shaft, said drive key further defining a generally rectilinear recess compliantly enclosing said metering piston.

2. The variable flow rate valve as set forth in claim 1 wherein said means for rotationally supporting said drive shaft is further comprised of an upper carrier element engaging said drive shaft and an upper main bearing for permitting rotation of said upper carrier element.

3. The variable flow rate valve as set forth in claim 2 wherein said valve further includes a guide pin in sliding engagement with said drive key.

4. The variable flow rate valve as set forth in claim 2 wherein said valve further includes a lower main bearing in said valve body, said lower main bearing in rotational engagement with said drive shaft.

5. The variable flow rate valve as set forth in claim 2 wherein said drive key is substantially rectilinear.

6. The variable flow rate valve as set forth in claim 5 wherein said drive key engages an upper stop surface said upper carrier element when said valve is in a full open position.

7. The variable flow rate valve as set forth in claim 6 wherein said means for incrementally rotating said drive shaft is further comprised of a rotary stepping motor.

8. A variable flow rate valve comprised of:
   a valve body defining an internal metering chamber having a substantially planar outlet metering surface, said valve body having a first wall with an inlet aperture for permitting fluid flow into said metering chamber and a second wall with an outlet aperture for permitting fluid flow from said metering chamber, said valve body further defining a circular upper bore and a base;
   a substantially rectilinear metering piston disposed in said metering chamber for upward movement and for downward movement, said metering piston including a metering surface in sliding engagement with said planar outlet surface and a horizontal slot in an opposed surface, said metering piston having a metering orifice;

a drive key disposed in said internal metering chamber, said drive key including a bore therethrough, said bore including a threaded portion, said drive key further defining a generally rectilinear recess for compliantly substantially enclosing said metering piston;

a drive shaft rotatably disposed in said internal metering chamber in threaded engagement with said threaded portion of the bore of said drive key;

means for rotationally mounting said drive shaft in said valve body, said mounting means providing substantial axial rigidity during the rotation of said drive shaft; and a stepping motor for incrementally rotating said drive shaft.

9. The variable flow rate valve as set forth in claim 8 wherein said means for rotationally mounting said drive shaft further includes an upper carrier element fixed to said drive shaft for concurrent rotation and an upper main bearing for rotationally supporting said upper carrier element.

10. The variable flow rate valve as set forth in claim 9 wherein said stepper motor further includes an exterior shell and a motor drive shaft, said motor drive shaft fixed to said upper carrier element.

11. The variable flow rate valve as set forth in claim 10 wherein said valve further includes a pin engaging said motor shell for preventing rotation of said motor shell.

12. The variable flow rate valve as set forth in claim 11 wherein said upper carrier element further includes an upper carrier stop surface for contacting said drive key to limit upward movement thereof.

13. The variable flow rate valve as set forth in claim 12 wherein said means for rotationally supporting said drive shaft further includes a lower main bearing in said internal metering chamber of said valve body.

14. The variable flow rate valve as set forth in claim 8 wherein said drive key further includes a transmission bore for permitting fluid flow through said drive key and said metering orifice.

15. The variable flow rate valve as set forth in claim 14 wherein said drive key further includes a guide bore.

16. The variable flow rate valve as set forth in claim 15 wherein said valve further includes a selectively operable axial closure device having a lock member for extending through said guide bore for forcibly seating said metering piston in a full closed position.

17. The variable flow rate valve as set forth in claim 16 wherein said guide bore is parallel to said transmission bore.

18. The variable flow rate valve as set forth in claim 17 wherein said drive shaft bore of the drive key intersects said guide bore and said transmission bore.

19. The variable flow rate valve as set forth in claim 14 wherein said drive key includes two parallel guide bores disposed aside said drive shaft bore.

20. The variable flow rate valve as set forth in claim 19 said valve further includes a selectively operable axial closure device having a lock member for extending through said guide bores for forcibly seating said metering piston in a full closed position.

21. The variable flow rate valve as set forth in claim 20 wherein said lock member further includes divided end portions for extending through said guide bores to forcibly seat said metering piston in a full closed position.

22. The variable flow rate valve as set forth in claim 14 wherein said drive key includes a guide bore parallel to said transmission bore and a drive shaft bore offset with respect to said guide bore and said transmission bore so that said drive shaft bore and said guide bore do not intersect.

23. The variable flow rate valve as set forth in claim 22 wherein said valve further includes a selectively operable axial closure device having a lock member for extending through said guide bore for forcibly seating said metering piston in a full closed position.

* * * * *